United States Patent [19]

Pominski et al.

[11] 4,355,051
[45] Oct. 19, 1982

[54] DIRECT EXTRACTION PROCESS FOR THE PRODUCTION OF A WHITE DEFATTED FOOD-GRADE PEANUT FLOUR

[75] Inventors: Joseph Pominski, Metairie; James J. Spadaro, New Orleans; Henry M. Pearce, Metairie, all of La.

[73] Assignee: The United States of America as represented by the Secretary of Agriculture, Washington, D.C.

[21] Appl. No.: 187,382

[22] Filed: Sep. 15, 1980

Related U.S. Application Data

[63] Continuation-in-part of Ser. No. 99,812, Dec. 3, 1979, abandoned, which is a continuation of Ser. No. 909,160, May 24, 1978, abandoned.

[51] Int. Cl.³ .............................................. A23L 1/36
[52] U.S. Cl. ................................ 426/632; 260/412.4; 426/430; 426/460; 426/464
[58] Field of Search .............. 426/417, 430, 457, 460, 426/464, 473, 481, 482, 632, 288; 260/123.5, 412.4

[56] References Cited

U.S. PATENT DOCUMENTS

| 3,928,635 | 12/1975 | Ohta et al. | 426/632 |
|---|---|---|---|
| 3,947,599 | 1/1975 | Mitchell, Jr. | 426/632 |
| 4,008,210 | 2/1977 | Steele et al. | 426/430 |
| 4,025,658 | 5/1977 | Pominski et al. | 426/632 |

OTHER PUBLICATIONS

Ayres; *Journal of American Oil Chemists Society;* "Processing of Edible Peanut Flour and Grits", vol. 51, pp. 133–136, 1974.
Pominski et al.; *Journal of American Oil Chemists Society;* "Filtration–Extraction of Peanuts on a Bench Scale", vol. 32, pp. 361–364.

*Primary Examiner*—Steve Alvo
*Attorney, Agent, or Firm*—M. Howard Silverstein; David G. McConnell; Raymond C. Von Bodungen

[57] ABSTRACT

A white, defatted, food-grade peanut flour having an unusually high protein solubility and being suitable for human consumption is disclosed. Peanuts are heated, in preparation for blanching, at temperatures of about 220°–250° F., for a period of time sufficient to eliminate the raw peanut taste. The peanuts are blanched, remoisturized without heat, flaked, solvent extracted, filtered, desolventized and ground into flour.

4 Claims, No Drawings

DIRECT EXTRACTION PROCESS FOR THE PRODUCTION OF A WHITE DEFATTED FOOD-GRADE PEANUT FLOUR

CROSS-REFERENCE OF RELATED APPLICATIONS

This is a continuation-in-part of application Ser. No 99,812, filed Dec. 3, 1979; now abandoned which was a continuation of application Ser. No. 909,160, filed May 24, 1978, now abandoned.

BACKGROUND OF THE INVENTION

1. Field of the Invention

This invention relates to food-grade flour and to the production thereof from peanuts. More specifically, this invention relates to the production of a white, defatted, flour by solvent extraction.

2. Description of the Prior Art

There is no known commercial method for the direct solvent extraction of peanuts to produce a peanut flour with all the characteristics of the present invention. The prior art teaches direct solvent extraction which leaves much to be desired in that excessively large quantity of fines are obtained. These tend to clog extraction equipment thereby making it impractical to use this means of extraction commercially.

The literature discloses a commercial production of peanut flour which utilizes a combined prepress solvent extraction method. In that method the peanuts are cooked and screw-pressed at high temperature to obtain a residual oil of about 11% prior to solvent extraction, and that method yields a flour with a tan color and a protein solubility of only 59%, thereby limiting its use in food products. (See "Processing of Edible Flour and Grits," by J. L. Ayres, et al., J. Am. Oil Chem. Soc., 51, 4, 133-136, 1974.)

J. Pominski, et al disclosed the mild cooking/wet heat conditioning of peanuts prior to extraction in "Filtration-Extraction of Peanuts on a Bench Scale," JAOCA 32 (6) (1955). However, no process for obtaining a white, bland food-grade flour is disclosed.

In the above operations peanuts are generally not blanched, i.e., the skins are not removed. When the skins are removed, the following conventional procedure is used: The peanuts are heated to about 180° F. (82.2° C.) for about 20 minutes, which coincidentally reduces the moisture content from about 8% to 5%. Peanuts are then passed through blanching rollers to remove the loosened skins by aspiration. Peanuts with skins removed (blanched) in this manner are then flaked and solvent extracted yield a raw-tasting peanut flour.

Another disadvantage of the processing by the teachings of the prior art, in preparation of the peanuts for extraction, the peanuts are first comminuted (cracked) to a particle size of about ⅛ inch, then "rolled" (flaked through smooth rolls), a procedure that is not conducive to practical oil extraction by the "direct solvent extraction" method because of its tendency to produce troublesome fines. Direct solvent extraction is a method wherein peanuts are not "cooked" and prepressed prior to solvent extraction.

It has been possible to extract the oil from cottenseed and soybean directly with solvent, that is, without first cooking and pressing, but the application of this method to peanuts has not proven feasible. The reason for this is that when the current direct solvent extraction method is applied to peanuts the bed of flakes tend to pack, causing the solvent to channel unevenly through the flakes, resulting in non-homogeneous, high lipids flour or meal. Also, excess fines are produced as the oil is removed, and the fines that are formed tend to block the screens under the bed of flakes, making extraction even more impractical. Fines also get into the oil recovery system and tend to clog equipment such as the solvent evaporators. For these reasons, direct solvent extraction has not been used commercially for peanuts.

Other attempts to achieve similar goals to those of the present invention are indicated in U.S. Pat. No. 3,947,599 wherein peanuts with high oil content are mixed with water to make a slurry from which the volatile flavors are removed; and in U.S. Pat. No. 3,928,635 wherein peanuts are sliced in an effort to prepare peanut flakes for extraction.

U.S. Pat. No. 4,008,210 teaches that in order to obtain high quality, high protein flour from peanuts by direct extraction, the process must include the essential steps of wet heat conditioning followed by flaking and dry heat conditioning.

SUMMARY OF THE INVENTION

The instant invention relates to a peanut flour product which is unusually high in protein solubility and lends itself to the production of bakery products. Shelled, raw, unblanched peanuts are heated at a temperature of about 220° to 250° F. for a period of time sufficent to eliminate raw peanut taste, to enable the production of a white flour, and to reduce the moisture content of said peanuts to less than 5%. The peanuts are then blanched and remoisturized without heating until a moisture level is reached that will permit high acceptable mass velocities during subsequent solvent extraction and filtering steps of flaked peanuts. The peanuts are then flaked, solvent extracted, filtered and desolventized. The resultant flakes are ground into flour.

The combination of the initial heating step in the temperature range of 220°-250° F. along with the subsequent step of remoisturizing without heating of the blanched peanuts is critical to the process and is credited with the unexpected result of achieving unusually high protein solubility in the resultant peanut flour.

It should be noted that nothing in the prior art teaches the combination of these two critical steps, since the milk process of Pominski et al is not a process for the production of flour nor does it teach the critical step of remoisturing without heat. Heretofore, the remoisturing of peanuts was accomplished with the use of heat in order to make the oils in peanuts more extractable in the subsequent processing. It was always known in the prior art to remoisturize using heat in order to remove the raw taste from peanuts. Therefore, it was quite unexpected that the aforementioned critical combination of steps resulted in extremely high protein soluble products dramatically improved in flavor for human consumption.

DESCRIPTION OF THE PREFERRED EMBODIMENTS

In the practice of the present invention, prior art heating techniques, such as heating with hot air, are utilized to heat the shelled peanuts in preparation for removing the skins. However, the heating temperature is substantially higher than the prior art, prior to blanching and the combination of heating temperature and time are sufficient to eliminate the raw peanut taste and to enable the production of a white flour in the subsequent solvent extraction step.

Generally, the peanuts are heated to a temperature of about 220°–250° F., preferably about 230°–250° F. and the heating time period is about 14–45 minutes, preferably about 15–30 minutes, of which the lower temperatures require the longer heating time periods.

By means of this special heat treatment, the moisture content of the peanuts usually is reduced to 5% or less, preferably about 1.5–3.5%.

The peanuts are then remoisturized to about 8–10% without the use of heat to eliminate undesirable fines during subsequent flaking and solvent extraction and to impart high protein solubility and improved mass velocity characteristics to the peanuts. Remoisturization may be accomplished in a humidity-controlled cabinet or zone, or by sprinkling the nuts with water and thereafter allowing the moisture to permeate the sprinkled nuts. Additionally, the nuts may be comminuted (cracked) into smaller particle size, e.g., about ⅛ inch.

Following the special treatment, the skins are removed and the peanuts are flaked, solvent-extracted, desolventized, and ground to flour. Flake sizes generally range from about 0.006 to 0.015 inch in thickness, preferably about 0.008 to 0.010 inches.

In the solvent extraction step, food-grade solvents such as hexane, propane, heptane are suitable. A typical solvent-to-flake ratio for a solvent such as hexane is about 1:1 to 3:1. Extraction temperatures usually are about 75°–140° F., preferably the higher temperatures. Desolventizing temperatures may range from about 140°–200° F. (60.0–93.3° C.).

The final product, generally having a particle size such that 75% is less than 75 microns in diameter, is a white, bland flour fit for human consumption in the form, for example, of bakery products, pastry, or foods that require protein fortification, and the product contains about 60–65% protein of which about 85–90% is soluble protein.

The present invention generally is applicable to all the basic varieties of peanuts including Virginia, Spanish, Runner, and Florunner peanuts.

The following examples are provided to illustrate the process and product of this invention, and should not be construed as limiting the invention in any manner whatever. All percentages recited herein are by weight.

EXAMPLE I

Heat Treatment of Raw Shelled Peanuts

A series of tests was conducted to determine the feasibility of heat application to the shelled peanuts for eliminating the raw taste without affecting the protein solubility and without darkening the peanuts. Raw shelled peanuts with skins having 5.6% moisture and a protein solubility of 89.2% at pH 7.5 were heated for from 20 to 45 minutes at temperatures ranging from 100° to 325° F., Table I (Experiments 1-7). Experiment 1 represents a conventional blanching treatment to remove skins. The blanched peanuts resulting from Experiment 1 were subsequently used in Experiments 6 and 7, Table I. After each heat treatment (Experiments 1-7) the peanuts were analyzed for moisture content, and protein solubility by conventional laboratory techniques. The skins were removed from heat treated peanuts from Experiments 2-6 so that they could be examined visually for color along with the peanuts from Experiments 1, 6, and 7. The presence or absence of peanut raw flavor was determined by a taste panel.

The data in Column 3 show that the best temperature and heating time for eliminating the raw taste without affecting the protein solubility and without darkening the peanuts, are 230° F. (104° C.) and 20 minutes. And, results are also considered satisfactory at 250° F. (121° C.) for 30 minutes, though an "ivory white" peanute is attained (see Column 4). The terms protein solubility and nitrogen solubility are considered synonymous by those in the art.

TABLE I

| | HEAT TREATMENT OF WHOLE PEANUTS | | | | | | |
|---|---|---|---|---|---|---|---|
| Experiment Number | 1 | 2 | 3 | 4 | 5 | 6 | 7 |
| Temperature, °F. | 100–190° | 210° | 230° | 250° | 250° | 275° | 325° |
| Time, Minutes | 35 | 30 | 20 | 30 | 45 | 45 | 14 |
| Final Moisture, % | 5.4 | 3.4 | 3.3 | 1.7 | 1.6 | 1.0 | — |
| Protein/Nitrogen Solubility at pH 7.5 (%) | 90 | 91 | 91 | 91 | 90 | 81 | 22.5 |
| Raw Taste, Whether It Was Eliminated | No | No | Yes | Yes | Yes | Yes | Yes |
| Color of Treated Peanuts | White | White | White | Ivory White | Yellow White | Light Tan | Dark Tan |

EXAMPLE 2

Comparative Study in Flake Preparation

Peanut flakes were prepared in a conventional manner by passing whole or half peanuts without skins through corrugated crackling rolls to break them into pieces of about ⅛ inch, followed by passing the pieces through smooth flaking rolls. Another portion of whole or half peanuts without skins were flaked directly without having been previously cracked.

In both portions of flakes, the moisture content of the peanuts was about 9% and the flake thickness was about 0.009 inch. The following process steps were then followed: One pound of flake sample was mixed with hexane (the extraction solvent) for 30 minutes at 140° F. (60° C.). The resulting slurry was filtered to remove the miscella (oil-hexane mixture). Then the resultant filtered cake was percolated with solvent at room temperature to wash and remove any remaining miscella. The filter cake was then reslurried with hexane for 30 minutes at 140° F. (60° C.), and then filtered. This filter cake was again percolated with solvent to wash as before. The solvent-to-meal ratio used was 1.5 to 1. As noted in Table II there was a dramatic difference in filtration times and mass velocities.

Mass Velocity is a measure of the rate of time required for a quantity of solvent to pass through a bed of flakes. Experience shows that a mass velocity of less than about 2000 is not practical in commercial operations because the resulting long filtration time makes the process uneconomical. A low mass velocity and long filtration time indicates the presence of excessive fines. These fines tend to clog the filter medium, thereby decreasing the mass velocity. Furthermore, the fines get into the solvent-oil mixture, also making oil recovery difficult and costly. As noted in Table II, the test wherein the peanuts were directly flaked showed a desirable high mass velocity of 3406 pounds per square foot per hour (lbs/sq.ft./hr) as compared to the impractical mass velocity of only 265 for the peanuts that were cracked and flaked. Also, the total filtration time was appreciably less for the directly flaked test, 70 seconds versus 1015 seconds, and the residual fat in the meal was lower, 1.0% versus 1.8%. To convert the units of mass velocity to gal./sq.ft./min. multiply lbs./sq.ft./hr. by 0.00294.

TABLE II
EFFECT OF METHOD OF FLAKING PEANUTS

| Preparation Method | Cracked & Flaked | Flaked Directly |
|---|---|---|
| Extraction Time, Hrs. | 1 | 1 |
| Filtration Time, Sec. | 1015 | 70 |
| Mass Velocity, lbs/sq.ft/hr Extracted Meal | 265 | 3406 |
| Water Content, % | 11.1 | 13.4 |
| Fat Content, % | 1.8 | 1.0 |

EXAMPLE 3
Effects of Moisture in Flake Preparation

Two samples of blanched peanuts, one with a moisture content of 6.1% and the other with a moisture content of 9.0% were flaked directly as described in Example 2. The 9.0% moisture samples have been prepared by a step of remoisturization without heat. Extraction conditions were also the same as in Example 2. Extraction of the flakes that were prepared with the low moisture content peanuts (6.1%) resulted in a very low (inadequate) mass velocity of 338 lbs/sq ft/hr and an undesirable long filtration time of 786 seconds, whereas extraction of the flakes prepared with the 9.0% moisture peanuts resulted in a (very desirable) mass velocity of 3406 lbs/sq ft/hr and a short filtration time of 70 seconds. This data is tabulated in Table III.

TABLE III
EFFECT OF MOISTURE CONTENT OF PEANUTS

| | Moisture Content | |
|---|---|---|
| | 6.1% | 9.0% |
| Filtration Time, Sec | 786 | 70 |
| Mass Velocity, lbs/sq ft/hr Extracted Flakes | 338 | 3406 |
| Water Content, % | 12.2 | 13.4 |
| Fat Content, % | 0.6 | 1.0 |

EXAMPLE 4
Comparative Study to Illustrate the Effect of Extraction Time and Solvent-to-Meal Ratio, and Determine Preferred Embodiments In order to determine the effect of (1) solvent-to-meal ratio and (2) extraction time with reference to the extraction characteristics, batch Experiments 1–4, Table IV, were conducted as follows:

Shelled Spanish peanuts were heated for 16 minutes at 230° F. (110° C.) to remove their raw taste. This was for a sufficient time to eliminate raw peanut taste, to enable the production of a white flour and to reduce the moisture content of the peanuts to less than 5%. The skins were then removed (blanched) from the peanuts and the peanuts were remoistened without heat to 9% moisture content prior to flaking in order to obtain moisture levels that will permit high acceptable mass velocity during subsequent solvent extraction and filtration steps. The flaking rolls were adjusted to obtain a flake with 0.009 inch thickness and the peanuts were flaked. Extraction and filtration steps similar to those of Example 2 were then conducted on the flaked peanuts in which the extraction temperature was maintained at 140° F. (60° C.) and extraction times were varied from one to two hours and the solvent-to-meal ratio ranges from 1.5:1 to 3:1. In Experiments 1–4 mass velocities of from about 3700–5600 pounds per square foot per hour were obtained but solvent-to-meal ratio of 3:1 was needed to obtain a fat content of less than 2%.

Utilizing the same heating and extracting conditions as described for batch experiment, continuous pilot plant runs were carried out in a Crown Extractor (which is a percolation type process). As shown in Table IV, for an extraction time of two hours with a 3:1 solvent-to-meal ratio, a residual fat content of 1.8% was obtained (Experiment 5) When the solvent-to-meal ratio was increased to 4:1, the residual fat content decreased to 1.5% (Experiment 6).

In Experiments 1–6 the extracted flakes were desolventized at temperatures of up to about 200° F. (93.3° C.) and ground into a flour which was white and had no raw taste and resulted in significantly improved protein solubilities.

The resultant flour showed significant increase in protein/nitrogen solubility over that prepared by prior art technique. Higher mass velocities were also recorded.

The aforementioned procedures would apply to any commerical filtration or percolation process.

TABLE IV
EXTRACTION OF PEANUTS

| | Bench Scale (Batch) | | | Pilot Plant (Continuously) | | |
|---|---|---|---|---|---|---|
| Experiment Number | 1 | 2 | 3 | 4 | 5 | 6 |
| Rate of Feed, lbs/hr | — | — | — | — | 70 | 70 |
| Extraction Time, hrs | 1.0 | 1.5 | 2.0 | 2.0 | 2.0 | 2.0 |
| Solvent-to-meal Ratio | 1.5:1 | 2:1 | 2:1 | 3:1 | 3:1 | 4:1 |
| Mass Velocity lbs/sq ft/hr Extracted Meal | 4410 | 5637 | 3912 | 3728 | — | — |
| Water Content, % | 10.2 | 11.2 | 15.0 | 14.6 | 7.6 | 6.8 |
| Fat Content, % | 3.6 | 2.5 | 2.0 | 1.6 | 1.8 | 1.5 |
| Protein Content, % Moisture Free | 62.4 | 64.1 | 63.8 | — | 1 | 66.7[1] |
| Protein/Nitrogen Solubility, % 7.5 pH | 88.5 | 88.1 | 87.8 | — | 1 | 89.0[1] |

[1] The products of Experiments 5 and 6 were combined before Protein Content and Protein Solubility were determined.

We claim:
1. A process for preparing a defatted peanut flour consisting essentially of the following steps:
   a. heating shelled, raw, unblanched peanuts at a temperature of about 220° to 250° F. for a period of time sufficient to eliminate raw peanut taste, to enable the production of a white flour, and to reduce the moisture content of said peanuts to less than 5%;
   b. blanching the peanuts resulting from step (a);
   c. remoisturizing without heating the blanched peanuts resulting from step (b) to a moisture level of 8 to 10% to permit high acceptable mass velocities during subsequent solvent extraction and filtering of flaked peanuts in step (e);
d. flaking the peanuts resulting from step (c);
e. solvent extracting and filtering the flaked peanuts at high mass-velocities resulting from step (d);
f. desolventizing the extracted product of step (e); and
g. grinding the desolventized flakes resulting from step (f) into flour, said flour characterized as being white, having no raw peanut taste, and as having a nitrogen solubility of from about 88 to 90% at a pH of 7.5.

2. The process of claim 1 wherein the temperature in step (a) is from about 230° to 250° F.

3. The process of claim 1 wherein the period of time in step (a) is from about 15–45 minutes.

4. The process of claim 1 wherein the temperature in step (a) is from about 230° to 250° F. and the period of time in step (a) is from about 15–45 minutes.

* * * * *